United States Patent Office 3,101,325
Patented Aug. 20, 1963

3,101,325
TRIALKYL 9(10)-PHOSPHONOSTEARATES AS PLASTICIZERS FOR VINYL CHLORIDE POLYMERS
Daniel Swern and Richard Sasin, Philadelphia, Pa., assignors to the United States of America as represented by the Secretary of Agriculture
No Drawing. Original application May 19, 1959, Ser. No. 814,357, now Patent No. 2,988,558, dated June 13, 1961. Divided and this application Apr. 28, 1960, Ser. No. 35,858
6 Claims. (Cl. 260—30.6)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a division of application bearing Serial No. 814,357, filed May 19, 1959, now Patent No. 2,988,558.

This invention relates to the preparation of trialkyl 9(10)-phosphonostearates and to compositions containing these new phosphorus derivatives.

An object of this invention is to prepare alkyl phosphonate derivatives of an ester of a fatty acid which contains an isolated, relatively unreactive double bond.

Another object is to prepare efficient low temperature plasticizers for polymers such as poly(vinyl chloride). A further object is to prepare low temperature plasticizers which have unusually low migration characteristics.

Other objects and a fuller understanding of the invention may be had by referring to the following description and claims.

According to the present invention trialkyl phosphonostearates of the general formula

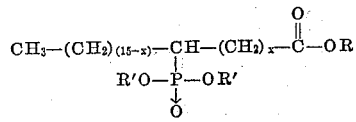

wherein R and R' are alkyl radicals containing 1 to 8 carbon atoms and $x$ is a number selected from the group consisting of 7 and 8, are prepared by a process comprising reacting a dialkylphosphonate having the formula

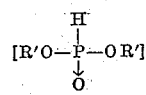

wherein R is an alkyl radical containing 1 to 8 carbon atoms, such as dimethyl phosphonate, diethyl phosphonate, di-n-butyl phosphonate, or di-(2-ethylhexyl) phosphonate with an alkyl oleate having the formula

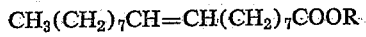

wherein R is an alkyl radical containing 1 to 8 carbon atoms, such as methyl oleate, ethyl oleate, n-butyl oleate, or 2-ethylhexyl oleate at a temperature of at least about 100° C. in the presence of a decomposing peroxide having a half life long enough to give activating species during the reaction period, such as tertiary butyl perbenzoate, and under an atmosphere of an inert gas, for example, nitrogen, until the reaction is complete.

Under the described conditions substantially quantitative yields of product are obtained in a few hours. The product is a mixture of the 9- and 10-dialkyl phosphonate derivatives, since no selective addition effects are operative, the optional positions being shown in the general formula by the use of the subscript $(15-x)$ where $x$ is 7 or 8.

The trialkyl 9(10)-phosphonostearates are readily compatible with vinyl chloride polymers and are efficient low-temperature plasticizers for these polymers. For example, when one of these polymers is plasticized with about 35%, by weight, of one of these phosphonostearates, a flexible composition containing this amount of plasticizer is produced. This may be seen by reference to Examples 9–13 hereinafter. Moreover, the compounds of this invention are outstanding in that they have a low and constant migration loss, only 8–9% as compared with 23% loss for di(2-ethylhexyl) sebacate.

*Preparation of alkyl oleates.*—These are prepared in the conventional manner, as illustrated. Methyl and ethyl oleate were prepared by refluxing oleic acid (a low linoleic-grade) with a 5-molar excess of absolute methanol or ethanol, using naphthalene-2-sulfonic acid as catalyst. After several water washes, followed by drying over anhydrous sodium sulfate, the esters were fractionally distilled under diminished pressure.

The n-butyl and 2-ethylhexyl oleates were prepared with azeotropic distillation of water, as described by D. Swern et al., J. Am. Chem. Soc., 67, 902 (1945). The butyl alcohol was the best available commercial grade and the 2-ethylhexyl alcohol was a redistilled fraction, B.P. 183–184° C. These esters were also fractionally distilled.

*Fractionation of dialkyl phosphonates.*—Commercially available dialkyl phosphonates were distilled to obtain the following pure fractions: dimethyl phosphonate, B.P. 72° C. at 25 mm. mercury pressure; diethyl phosphonate, B.P. 73° C. at 10 mm.; di-n-butyl phosphonate, B.P. 64° C. at 0.05 mm.; and di-2-ethylhexyl phosphonate, B.P. 128–130° C. at 0.1 mm.

The following examples illustrate the preparation of trialkyl 9(10)-phosphonostearates. All reactions and distillations were conducted in an atmosphere of nitrogen.

EXAMPLE 1

Methyl oleate (0.2 mole), dimethyl phosphonate (0.6 mole) and 0.005 mole of tertiary butyl perbenzoate were combined in a 500 ml. round-bottomed flask equipped with a magnetic stirrer and a nitrogen inlet tube. The reaction was stirred and heated at 100–110° C. for 4 hours. Additional paroxide (0.005 mole) was added after 2 hours elapsed time to facilitate the reaction. The reaction mixture was distilled under diminished pressure to recover excess dimethyl phosphonate. Total yield of crude trimethyl 9(10)-phosphonostearate was substantially quantitative. This product was distilled and a fraction having a uniform boiling point of 130° C. at 0.001 mm. (representing a 68% yield) was retained for analytical determinations (cf. Table I) and for evaluation as a plasticizer.

peroxide, give unsatisfactory yields at the reaction temperatures employed.

The preferred temperature is about 100° C. or higher. At temperatures much below 100° C. the addition is impractically slow. At a temperature in the range of 100 to 110° C. in the presence of t-butyl perbenzoate the reaction is complete in 4 hours, perhaps sooner in many

Table I

TRIALKYL 9(10)-PHOSPHONOSTEARATES [a]

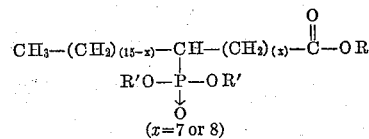

$$CH_3-(CH_2)_{(15-x)}-\underset{\underset{\underset{O}{\downarrow}}{R'O-P-OR'}}{CH}-(CH_2)_{(x)}-\overset{O}{\overset{\|}{C}}-OR$$

(x = 7 or 8)

| Example No. | R | R' | Yield,[b] percent | B.P. | | $n_D^{30}$ | $d_4^{30}$ | Phosphorus | | Molecular refraction | |
|---|---|---|---|---|---|---|---|---|---|---|---|
| | | | | ° C. | Mm. | | | Calcd. | Found | Calcd. | Found |
| 1 | CH₃ | CH₃ | 68 | 130 | 0.001 | 1.4531 | 0.9889 | 7.6 | 7.3 | 111.9 | 111.2 |
| 2 | C₂H₅ | C₂H₅ | 75 | 140 | 0.001 | 1.4492 | 0.9596 | 6.9 | 7.0 | 125.8 | 125.4 |
| 3 | n-C₄H₉ | n-C₄H₉ | 66 | 170 | 0.001 | 1.4502 | 0.9372 | 5.8 | 5.9 | 153.7 | 152.8 |
| 4 | 2-ethylhexyl | 2-ethylhexyl | 67 | 200 | 0.002 | 1.4555 | 0.9148 | 4.4 | 4.4 | 209.4 | 208.2 |
| 5 | C₂H₅ | n-C₄H₉ | 77 | 155 | 0.001 | 1.4504 | 0.9435 | 6.1 | 6.2 | 144.4 | 143.9 |
| 6 | n-C₄H₉ | C₂H₅ | 67 | 150 | 0.001 | 1.4489 | 0.9473 | 6.5 | 6.3 | 135.1 | 134.9 |
| 7 | 2-ethylhexyl | C₂H₅ | 68 | 170 | 0.001 | 1.4512 | 0.9362 | 5.8 | 5.5 | 153.7 | 153.3 |

[a] All of these compounds were distilled in a molecular still.
[b] Analytically pure fraction.

EXAMPLES 2 TO 7

Using the reaction conditions of Example 1, the remaining trialkyl phosphonostearates listed in Table I were prepared from the corresponding dialkyl phosphonates and alkyl oleates.

All the 9(10)-phosphonostearates of Table I are colorless, high-boiling, thermally stable liquids, insoluble in water and soluble in organic solvents. Pertinent analytical data regarding the products are presented in Table I.

While the examples cited do not cover all the possible combinations of alkyl substituents available from the reactants used it is readily apparent that methyl dibutylphosphonostearate, ethyl dimethylphosphonostearate, etc. may be prepared by the reaction of this invention by the proper choice of oleate ester and dialkyl phosphonate. It is considered that numerous dialkyl phosphonates, such as dipropyl phosphonate, dihexyl phosphonate, di-n-octyl phosphonate, etc., will react, under conditions described in Example 1, with a variety of alkyl oleates to give many more trialkyl 9(10)-phosphonostearates. Dialkyl phosphonates with longer chain alkyl groups also would be expected to react under the conditions described.

EXAMPLE 8

The process of Example 1 was repeated with the exception that no t-butyl perbenzoate was added, but an attempt was made to catalyze the reaction by irradiation at a distance of 1 inch by a 140-watt ultraviolet lamp (high pressure quartz mercury arc). The mixture yielded only unchanged reactants.

Not only is the presence of a decomposing peroxide necessary to promote the reaction of a dialkyl phosphonate with an alkyl oleate, but the choice of peroxide is important. The half-life of the peroxide should be long enough to give activating species during the reaction period. Peroxides with a short half-life, such as benzoyl instances as the progress of the reaction was not always checked against time. With the selection of a proper peroxide, higher temperatures for a shorter period of time may be employed. The reaction proceeds more rapidly under a blanket of inert gas such as nitrogen.

The molar ratio of reactants is not critical to initiation of the reaction, but for optimum yields it is preferable to employ an excess of the dialkyl phosphonate. This is readily recovered in the product-isolation process and can be reused.

The trialkyl 9(10)-phosphonostearates of Examples 1 to 7 were incorporated into compositions for evaluation as plasticizers. A commercial copolymer (Vinylite VYDR) containing 95 parts by weight of vinyl chloride and 5 parts by weight of vinyl acetate was used for these evaluations. Other vinyl chloride polymers and copolymers can be used, such as, poly(vinyl chloride), poly(vinyl chloride-acetate) containing more than 5% acetate or vinyl chloride copolymers with vinylidene chloride.

EXAMPLE 9

Trimethyl 9(10)-phosphonostearate (34 parts by weight), copolymer (VYDR) (64 parts by weight), with 1 part by weight each of commercial stabilizers [Epoxidized Soybean Oil and Advance Solvents and Chem. Corp. 52 (Organotin)] were milled. The phosphonostearate was readily compatible with the vinyl chloride copolymer. A portion of standard thickness milled sheet (0.002 inch thick) was prepared for determination of volatility and migration characteristics. The remainder of the milled composition was molded at 300° F. Test specimens were taken from a 6 x 6 x 0.075 inch molded sheet. The tests were made by a standard ASTM methods and the results are summarized in Table II.

Trialkyl 9(10)-phosphonostearates of Examples 2 to 7 were milled and molded exactly as described in Example 9 and the results of the evaluation tests are included in Table II as Examples 10 to 15 respectively.

For comparative purposes some commercial plastisizers were also milled and molded as in Example 9 and the results of evaluation of these compositions are also included in Table II.

Table II

COMPARISON OF PROPERTIES OF COMMERCIAL COPOLYMER (VYDR) PLASTICIZED WITH LONG CHAIN PHOSPHORUS COMPOUNDS AND COMMERCIAL PLASTICIZERS

| Ex. No. | Compound | Tensile strength, p.s.i. | Elongation, percent | Modulus 100%, p.s.i. | Clash-Berg T-200, °C | Migration, percent weight loss after 14 days [1] | Volatility, weight loss, percent |
|---|---|---|---|---|---|---|---|
| 9 | Trimethyl phosphonostearate | 2,900 | 345 | 1,200 | −31 | 8 | 2.1 |
| 10 | Triethyl phosphonostearate | 2,700 | 345 | 1,350 | −38 | 8 | 2.0 |
| 11 | Tributyl phosphonostearate | 2,700 | 360 | 1,350 | −46 | 8 | 1.6 |
| 12 | Tri(2-ethylhexyl) phosphonostearate | 3,000 | 310 | 1,700 | −48 | 8 | 2.1 |
| 13 | Ethyl dibutylphosphonostearate | 2,850 | 340 | 1,400 | −41 | 8 | 1.5 |
| 14 | Butyl diethylphosphonostearate | 2,750 | 360 | 1,350 | −45 | 9 | 1.1 |
| 15 | 2-ethylhexyl diethylphosphonostearate | 2,900 | 370 | 1,450 | −41 | 9 | 1.0 |
| COMMERCIAL CONTROLS | | | | | | | |
| | Di(2-ethylhexyl)phthalate (DOP) | 2,950 | 370 | 1,400 | −28 | 6 | 1.1 |
| | Di(2-ethylhexyl)sebacate (DOS) | 2,600 | 400 | 1,200 | −59 | 23 | 2.0 |
| | Tri(2-ethylhexyl)phosphate (TOP) | 2,600 | 390 | 1,275 | −60 | 17 | 3.6 |
| | Tricresyl phosphate (TCP) | 3,600 | 270 | 2,000 | −1 | 0.5 | 0.3 |

[1] A weight loss of 15% means that 15/34×100 or 44% of the original quantity of plasticizer has migrated out of the sheet into the silicic acid adsorbent.

The products of the present invention are efficient plasticizers, as shown by the figures for 100% modulus.

Among plasticizers commercially available for low temperature use, for example (DOS) and (TOP), this valuable characteristic cannot be fully utilized because of their high migration loss. Blending these plasticizers with a non-migrating plasticizer such as (TCP) detracts from the low temperature flexibility of the plasticized poly(vinyl chloride).

The plasticizing characteristics of the trialkyl 9(10)-phosphonostearates (Examples 9 to 15) are outstanding. They not only have a low migration loss (8 to 9%), but they impart good low temperature flexibility characteristics to poly(vinyl chloride) products (Examples 11 to 15 are in the −40 to −50 range). This desirable combination of characteristics has not been observed previously with any known plasticizer or combinations thereof.

We claim:

1. A flexible composition comprising polymerized vinyl chloride and, as a plasticizer therefor, about 35% by weight of a compound selected from the group of formulas consisting of

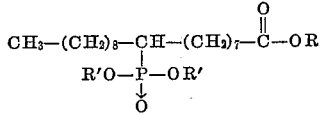

and

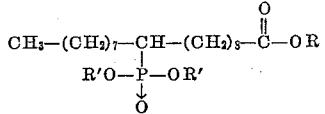

wherein R and R' are alkyl radicals containing 1 to 8 carbon atoms.

2. The flexible composition of claim 1 wherein R and R' are n-butyl.

3. The flexible composition of claim 1 wherein R and R' are 2-ethylhexyl.

4. The flexible composition of claim 1 wherein R is ethyl and R' is n-butyl.

5. The flexible composition of claim 1 wherein R is n-butyl and R' is ethyl.

6. The flexible composition of claim 1 wherein R is 2-ethylhexyl and R' is ethyl.

References Cited in the file of this patent

UNITED STATES PATENTS 2,963,458   Swern _____ Dec. 6, 1960

OTHER REFERENCES

Swern et al.: "Chemical and Engineering Data Series," volume 3, No. 2, October 1958, page 346. 260–30.6.